United States Patent [19]
Topff et al.

[11] Patent Number: 6,026,500
[45] Date of Patent: *Feb. 15, 2000

[54] METHOD AND SYSTEM FOR MANAGING COMPUTER SYSTEMS

[75] Inventors: Guido E. J. Topff, Brobbendonk, Belgium; Frederik P. J. Kouwenberg, Gouda, Netherlands

[73] Assignee: Electronic Data Systems Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/855,081

[22] Filed: May 13, 1997

[51] Int. Cl.[7] ...................................................... G06F 11/00
[52] U.S. Cl. ............................................................... 714/26
[58] Field of Search ........................ 395/483.22, 200.53, 395/200.54, 200.8, 184.01, 180, 183.02, 200.37, 200.33, 200.47, 200.48, 200.49; 364/474.22; 371/20.1; 340/825.06

[56] References Cited

U.S. PATENT DOCUMENTS

| | | | |
|---|---|---|---|
| 4,823,343 | 4/1989 | Takahashi | 371/16 |
| 5,084,875 | 1/1992 | Weinberger | 371/291 |
| 5,159,685 | 10/1992 | Kung | 395/575 |
| 5,317,676 | 5/1994 | Austvold et al. | 395/26 |
| 5,367,667 | 11/1994 | Wahlquist | 395/575 |
| 5,455,901 | 10/1995 | Friend et al. | 395/149 |
| 5,606,674 | 2/1997 | Root | 395/346 |
| 5,608,874 | 3/1997 | Ogawa et al. | 395/200.15 |

FOREIGN PATENT DOCUMENTS

| | | | |
|---|---|---|---|
| 0 295 426 | 12/1988 | European Pat. Off. | G06F 11/00 |
| WO 96/31035 | 10/1996 | WIPO | H04L 12/24 |

OTHER PUBLICATIONS

Yang, Shi, and Liu, "Distributed Applications Construction Environment", IEEE, pp. 466–473, 1995.

*Primary Examiner*—Robert W. Beausoliel, Jr.
*Assistant Examiner*—Pierre E. Elisca
*Attorney, Agent, or Firm*—L. Joy Griebenow; Baker & Botts L.L.P.

[57] ABSTRACT

According to one aspect of the invention, a method of managing a computer system includes receiving event information at a Tivoli Enterprise Console (130), the event information associated with the computer system. The method also includes receiving a command to provide a portion of the event information to a help desk application program and automatically providing the event information in a format readable by a ServiceCenter help desk application program (230) in response to receiving a command to provide a portion of the event information to a help desk application program.

22 Claims, 3 Drawing Sheets

METHOD AND SYSTEM FOR MANAGING COMPUTER SYSTEMS

TECHNICAL FIELD OF THE INVENTION

This invention relates generally to the field of computer systems management and more particularly to a method and system for managing computer systems.

BACKGROUND OF THE INVENTION

Computer systems have become pervasive in today's society. Although computer systems may provide many advantages that make work easier, computer systems often require maintenance. To assist in maintaining a computer system, infrastructure management tools are often employed. In some infrastructure management tools, an important aspect of infrastructure management is monitoring. Monitoring tools may try to detect errors in computer systems before they turn into problems and to react to possible problems before a customer experiences a problem and calls a help desk associated with the computer system.

In one monitoring system, an event may be generated for each monitored item that does not conform to established criteria. An event describes the specifics of the affected device, the reason for non-conformance, and additionally provides control information, such as severity, class, or the time that the problem was detected. The event information may be consolidated within an event manager. The event manager handles the display functions and processing of the events. One example of an event manager is the Tivoli Enterprise Console, available from Tivoli Systems of Austin, Tex.

The Tivoli Enterprise Console may handle all event processing for monitored devices and may present that information to monitoring operators. Conventionally, the monitoring operators assess all incoming events, investigate the possible causes, and apply proper correction procedures if necessary. If the monitoring operators decide that further escalation is necessary for an event or that other support groups need to be involved for solving the problem, then a help desk system may require the event information.

Help desk systems manage assignment of tasks related to solving various problems that may be experienced by a computer system. One example of a help desk system is ServiceCenter, available from Peregrine Systems, Inc. Although the Tivoli Enterprise Console and the ServiceCenter help desk each provide improvements to system management, the independent use of each of these creates several disadvantages. For example, events generated by the Tivoli Enterprise Console that require further assignment and escalation conventionally must be entered into the ServiceCenter help desk system manually. This procedure may retard or deter the overall problem solving process. In addition, in order to provide status tracking, an event identification number needs to be stored in each system. However, manual input of such an identification number may cause a considerable amount of overhead. Moreover, synchronization between the two management tools, which is desirable to provide the same problem information and event information to each management tool, cannot be readily achieved through separate use of each management tool because such synchronization may require help desk operators to have access to both management tools. Finally, manual integration of these two management tools could introduce typographical errors.

SUMMARY OF THE INVENTION

Therefore, a need has arisen for a new method and apparatus that addresses the disadvantages and deficiencies of the prior art. The invention comprises a method and system for managing a computer system.

According to one aspect of the invention, a method of managing a computer system includes receiving event information at a Tivoli Enterprise Console, the event information associated with the computer system. The method also includes receiving a command to provide a portion of the event information to a help desk application program and automatically providing the event information in a format readable by a ServiceCenter help desk application program in response to receiving a command to provide a portion of the event information to a help desk application program.

According to another embodiment of the invention, a management system for managing a monitored device in a computer system includes a computing system having at least one processor and at least one memory accessible by the at least one processor. The management system also includes a Tivoli Enterprise Console event management system stored in the computing system. The event management system is operable to receive and process an event having event information. The event is associated with the monitored devices. The management system also includes a ServiceCenter help desk application program stored in the computing system. The ServiceCenter help desk application program is operable to process a problem record. The management system also includes interface programming stored on the computing system that operable to provide the event information associated with the event to the help desk application program in a format readable by the help desk application program.

The invention provides numerous technical advantages. For example, the invention automatically provides information associated with an event received by an event manager to a help desk application, thus alleviating any delay associated with manual entry of this information and preventing errors associated with manual entry of this information. Furthermore, the status of the problem solution process, which is conventionally available to the help desk application, is automatically provided to the event manager. Thus the current status of the problem solving process can be known by operators of both management systems, rather than solely known by operators of the help desk application.

Moreover, any overhead associated with manually providing the problem solving status to the event manager is avoided. In addition, a problem identification number associated with the problem solving by the help desk application is automatically provided to the event manager, allowing status tracking without additional cost associated with manual entry of such an identification number.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Figure 1:
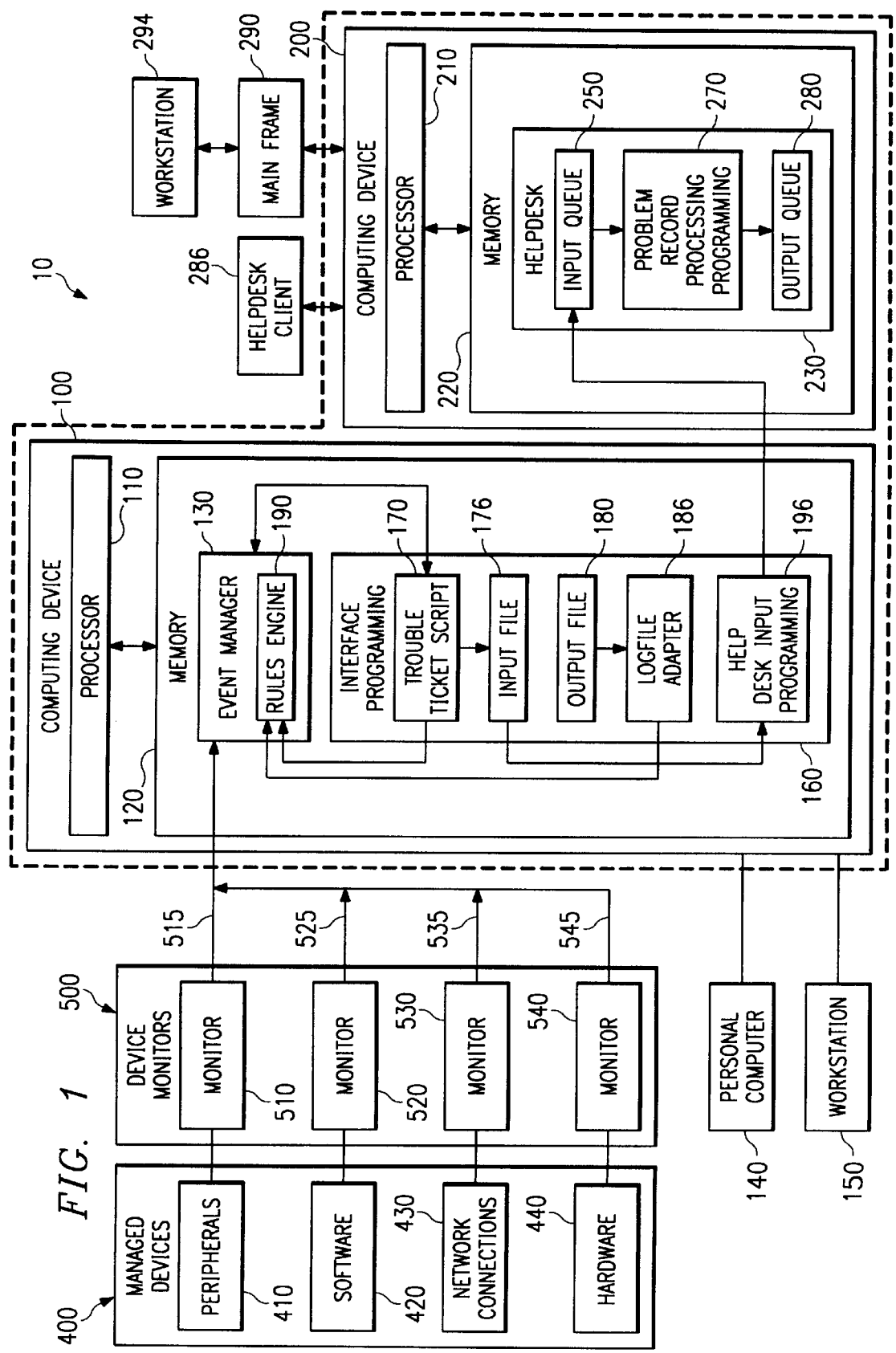
FIG. 1 is a block diagram of one embodiment of a systems management system according to the teachings of the present invention.

An embodiment of the present invention and its advantages are best understood by referring to FIG. 1 and FIGS. 2A through 2D of the drawings, like numerals being used for like and corresponding parts of the various drawings. FIG. 1 is a block diagram of one embodiment of a systems management system 10 according to the teachings of the present invention. Systems management system 10 allows for support of computer systems or devices by automatically providing information exchange between an event manager application program and a help desk application program.

Systems management system 10 preferably includes computing devices 100 and 200; however, computing devices 100 and 200 may be replaced with any suitable number of computing devices, including a sole computing device. Systems management system 10 receives signals from device monitors 500. Device monitors 500 monitor managed devices 400.

Managed devices 400 may include a variety of types of devices for which monitoring is desired. Exemplary types of devices suitable for management by systems management system 10 include peripherals 410, software 420, network connections 430, and other types of hardware 440. Non-conformance of managed device 400 with established criteria causes an event (not explicitly shown) to be generated.

Device monitors 500 are illustrated in block diagram form in FIG. 1 and may include a variety of different types of monitors, depending on the type of managed device. Device monitors 500 are shown as including device monitors 510, 520, 530, and 540; however, any suitable number of device monitors may be employed. Device monitors 510, 520, 530, and 540 produce event signals 515, 525, 535, and 545. Event signals 515, 525, 535, and 545 include event information associated with an event generated due to non-conformance of a managed device 400 with established criteria.

Event information may include, for example, details of the non-conforming managed device, the reason for non-conformance, control information such as problem severity, class of the problem, and the time the non-conformance was detected, and other suitable information. This event information received from device monitors 510, 520, 530, and 540 is consolidated within an event manager application program. An event manager application program handles display of event information to a monitoring operator and processing of event information. One example of an event manager application program is an event manager application program 130, which is illustrated in FIG. 1 and described in greater detail below.

Computing device 100 preferably includes a processor 110 and a memory 120. Processor 110 may be operable to execute and access information stored in memory 120. Memory 120 may include storage devices, such as disk drives or other suitable methods for storing data, as well as random access memory. In one embodiment, computing device 100 utilizes a UNIX operating system; however, any suitable type of computing device running on any suitable operating system may be used. Memory 120 stores event manager application program 130. In one embodiment, event manager application program 130 is a Tivoli Enterprise Console, produced by Tivoli Systems of Austin, Tex.

Event manager application program 130 is operable to process each of event signals 515, 525, 535, and 545 from device monitors 500 and to present the event information associated with each of event signals 515, 525, 535 and 545 to monitoring operators (not explicitly shown) for assessment. These monitoring operators may investigate the possible causes of non-conformance and apply proper correction procedures if necessary. If a monitoring operator decides that further attention to an event is necessary or that other support groups need to be involved to address the event, event information contained in event signals 515, 525, 535, or 545 is automatically transmitted from event manager application program 130 to a help desk application program. The help desk application program controls the overall problem management process.

Event information contained in event signals 515, 525, 535, or 545 may be automatically transmitted upon command by a monitoring operator. An example of a monitoring operator commanding the automatic transmission of event information contained in event signals 515, 525, 535, or 545 is a monitoring operator requesting the generation of a trouble ticket by clicking an option button in a menu bar of a computer display associated with event manager application program 130. In response to clicking an option button in a menu bar, as discussed in greater detail below, a Unix shell script is launched. The Unix shell script initiates the automatic transfer of event information contained in event signals 515, 525, 535, or 545. In another embodiment, event information contained in event signals 515, 525, 535, or 545 is also automatically sent to a help desk application program, but a command from a monitoring operator is not utilized. Rather, event manager application program 130 detects certain predetermined conditions associated with an event and, based on detecting certain predetermined conditions, automatically transmits the event information contained in event signals 515, 525, 535, or 545.

Event manager application program 130 is accessible to users through a number of suitable techniques. For example, a personal computer 140 running appropriate software or a workstation 150 may be used to access event manager application program 130.

Computing device 200 preferably includes a processor 210 and a memory 220 accessible by processor 210. In one embodiment, computing device 200 utilizes a UNIX operating system; however, computing device 200 may use any suitable operating system. Stored in memory 220 is a help desk application program 230. In one embodiment, help desk application program 230 is a ServiceCenter application program, available from Peregrine Systems Inc. Help desk application program 230 includes an input queue 250, a problem record processing programming 270, and an output queue 280. Each of these portions of help desk application program 230 is discussed in greater detail below. Help desk application program 230 may also contain additional programming.

Help desk application program 230 is accessible through a variety of techniques. For example, a help desk client 286, which is, for example, a dedicated personal computer or workstation directly connected to computing device 200 may be used to access help desk application program 230. Alternatively, for example, help desk application program 230 may also be accessed through a workstation 294 connected to a mainframe computer 290, which is in turn directly connected to computing device 200.

According to the teachings of the invention, help desk application program 230 receives event information received by event manager application program 130, opens a problem record (not explicitly shown), processes the problem record, and returns status information associated with the problem record for eventual receipt by event manager application program 130.

Interface programming 160 may be stored in memory 120, as illustrated in FIG. 1. Alternatively, interface programming 160 may be stored in any suitable location, such as within memory 220, or within memory located in another computing device. Interface programming 160 facilitates automatic communication of information between event manager application program 130 and help desk application program 230.

Portions of memory 120 are preferably accessible, not only by processor 110, but also by processor 210. Thus, execution of either event manager application program 130 by processor 110 or help desk application program 230 by processor 210 can alter portions of an input file 176 and an output file 180. Although computing devices 100 and 200 are shown as separate computing devices, each containing a separate processor and memory, these two separate computing devices 100, 200 may be replaced with a single computing device.

In one embodiment, interface programming 160 receives event information from event manager application program 130, interprets this event information, and provides this event information in an understandable format to help desk application program 230 for processing. In response to receiving this event information, help desk application program 230 generates a problem record associated with the event and processes the problem record. A problem record may contain information relating to an event, documentation relating to efforts to resolve non-conformance associated with an event, the status of efforts to resolve the non-conformance, and other additional information that is useful in resolving computer systems problems. In addition, interface programming 160 receives information relating to the processing of a problem record by help desk application program 230, such as status information. This received information is then interpreted by interface programming 160 and provided to event manager application program 130 in a form understandable by event manager application program 130.

Interface programming 160 may include a trouble ticket script 170. In one embodiment, trouble ticket script 170 is a UNIX Korn shell script; however, any suitable executable file or program may be used. Trouble ticket script 170 may be executed in response to receiving a command from a monitoring operator or, alternatively, automatically executed based on the content of event information received by event manager application program 130. Event information received by event manager application program 130 is available to trouble ticket script 170 through environment variables set by event manager application program 130. Execution of trouble ticket script 170 initiates automatic transfer of event information from event manager application program 130 to help desk application program 230.

In addition to other functions discussed in greater detail below, trouble ticket script 170 modifies input file 176 contained within interface programming 160. Once modified, input file 176 includes information received by trouble ticket script 170 from event manager application program 130 that is formatted for reception by help desk application program 230.

Interface programming 160, may also include output file 180. Output file 180 stores information containing, for example, the status of a problem record generated by help desk application program 230 in response to the transmission of event information from event manager application program 130 to help desk application program 230.

Interface programming 160 may also include a logfile adapter 186. Logfile adapter 186 monitors output file 180 for added text. Additions to output file 180 may include, for example, status information associated with an event. If a new line is written to output file 180, logfile adapter 186 sends the information contained in the new line to a rules engine 190.

Rules engine 190 is also interface programming, but may be contained within event manager application program 130. Rules engine 190 includes interface programming that cooperates with interface programming 160 to provide status information received from help desk application program 230 to the event manager application program 130 in a format understandable by help desk application program 230.

Interface programming 160 may also include help desk input programming 196. Help desk input programming 196 monitors input file 176 for added text. Text is added to input file 176 through execution of trouble ticket script 170. If text is added to input file 176, help desk input programming 196 sends the added text to input queue 250 of help desk application program 230 for subsequent processing by problem record processing programming 270. During processing and after processing is completed, information relating to, for example, the status of the processing is sent to output queue 280 for subsequent transmittal to output file 180. Thus, according to the invention, information may be automatically exchanged between an event manager application program and a help desk application program.

Figure 2A:
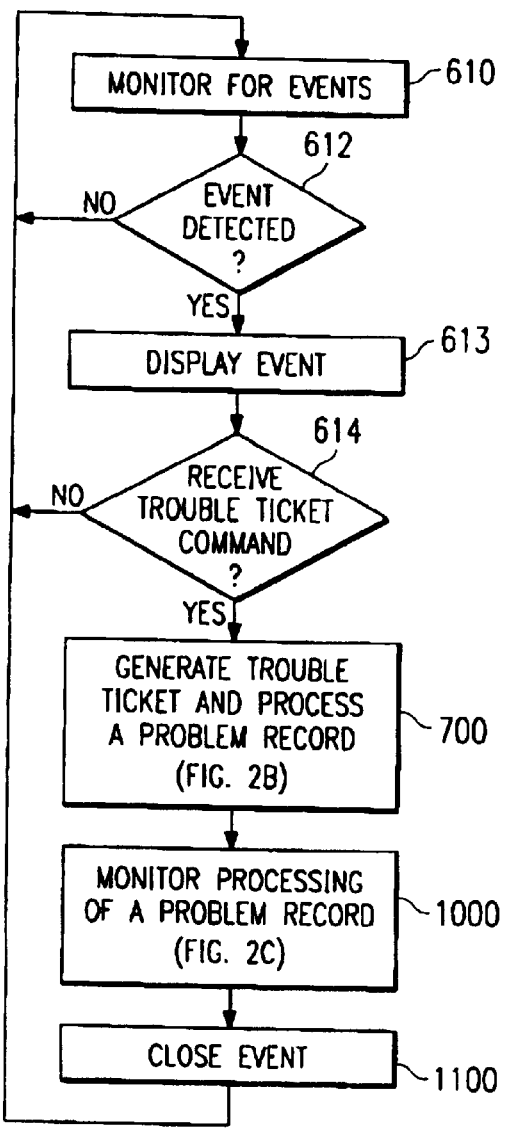
FIG. 2A is a flow chart illustrating exemplary steps associated with exchanging information between an event manager application program and a help desk application program according to the present invention.

With reference to FIG. 1 and FIGS. 2A through 2D, operation of systems management system 10 is described. FIG. 2A is a flow chart illustrating exemplary steps associated with the method of the invention, including detecting an event, automatically generating a trouble ticket associated with the event, opening a problem record, processing the problem record, and notifying event manager application program 130 of the status of processing of the problem record.

The method of the invention begins with the step 610 of monitoring for events. Device monitors 500 provide information to event manager application program 130. If an event is detected at step 612, event manager application program 130 receives event information from device monitors 500 describing details of the event, the reason for any non-conformance to preset criteria, and additional control information, such as severity of the problem, class of the problem, and the time of the problem. This event information is consolidated, correlated, and presented to a monitoring operator at step 613 by event manager application program 130 to determine if action by a help desk, such as help desk application program 230, is desirable. If a monitoring operator determines that action by help desk application program 230 is desirable, a trouble ticket command, requesting automatic generation of a trouble ticket, is generated. Alternatively, event manager application program 130 may automatically determine that action by help desk application program 230 is desirable based on the contents of the event information and initiate a trouble ticket command.

If action is desirable, a trouble ticket command is received at step 614. If automatic generation of a trouble ticket is commanded, at step 700 a trouble ticket is automatically generated and a problem record is opened and processed. The step 700 of automatically generating a trouble ticket and opening and processing a problem record is described in greater detail below in conjunction with FIG. 2B. A purpose of automatically generating a trouble ticket is to automatically provide information associated with an event to help desk application program 230 in a format understandable by help desk application program 230. The generated trouble ticket, which is stored in input file 176, contains information required by help desk application program 230 to open a problem record for processing and is also in a format understandable by help desk application program 230. A purpose of opening and processing a problem record is to determine the cause of the non-conformance associated with the event associated with the problem record and to remedy the non-conformance.

At step 1000, problem record processing that occurs at step 700 is monitored. Exemplary steps associated with step 1000 of monitoring processing of a problem record are illustrated in FIG. 2C. A purpose of monitoring processing of a problem record is to keep event manager application program 130 current as to the status of the problem solving associated with the non-conformance that generated the event. When processing of a problem record is concluded, the status of the event associated with the processed problem record is changed to "CLOSED" at step 1100, and the system continues to monitor for additional events. In one embodiment of the invention, an event can have three possible statutes: "OPEN," "CLOSED," and "ACKNOWLEDGED." An event has a status of "OPEN" when it is received by event manager application program 130. An event has a status of "CLOSED" when it has been closed. An event has a status of "ACKNOWLEDGED" after it has been acknowledged by an operator.

Thus, according to the invention, event information is automatically provided from event manager application program 130 to help desk application program 230 in a format understandable by help desk application program 230. Conversely, according to the invention, status information concerning processing of a problem record associated with an event is provided from help desk application program 230 to event manager application program 130 in a format understandable by event manager application program 130. This exchange of information facilitates the problem solving process and eliminates errors associated with manual entry of the above-described information.

Figure 2B:
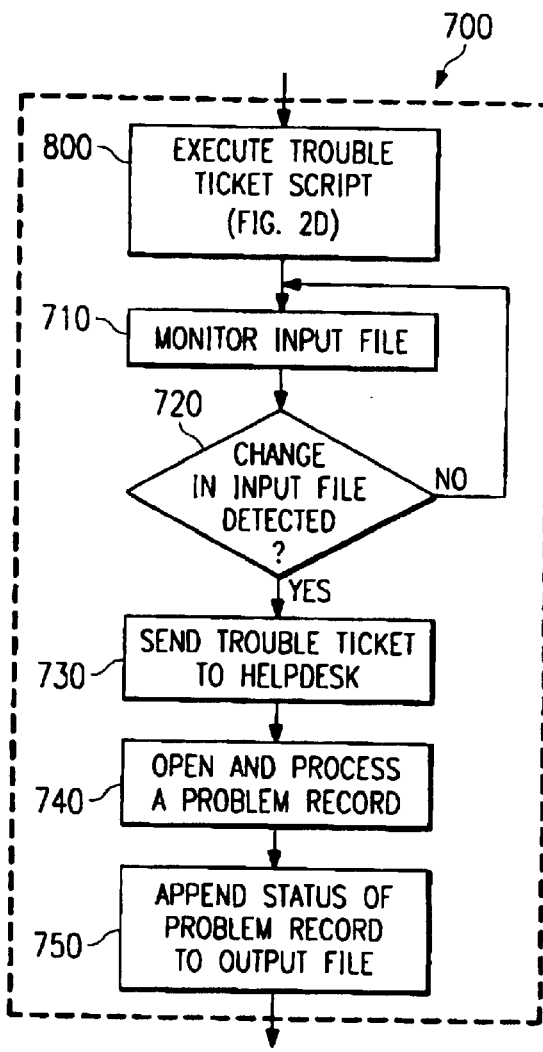
FIG. 2B is a flow chart illustrating exemplary steps of a portion of the flow chart illustrated in FIG. 2A, showing additional details associated with automatic generation of a trouble ticket and opening and processing of a problem record.
Figure 2C:
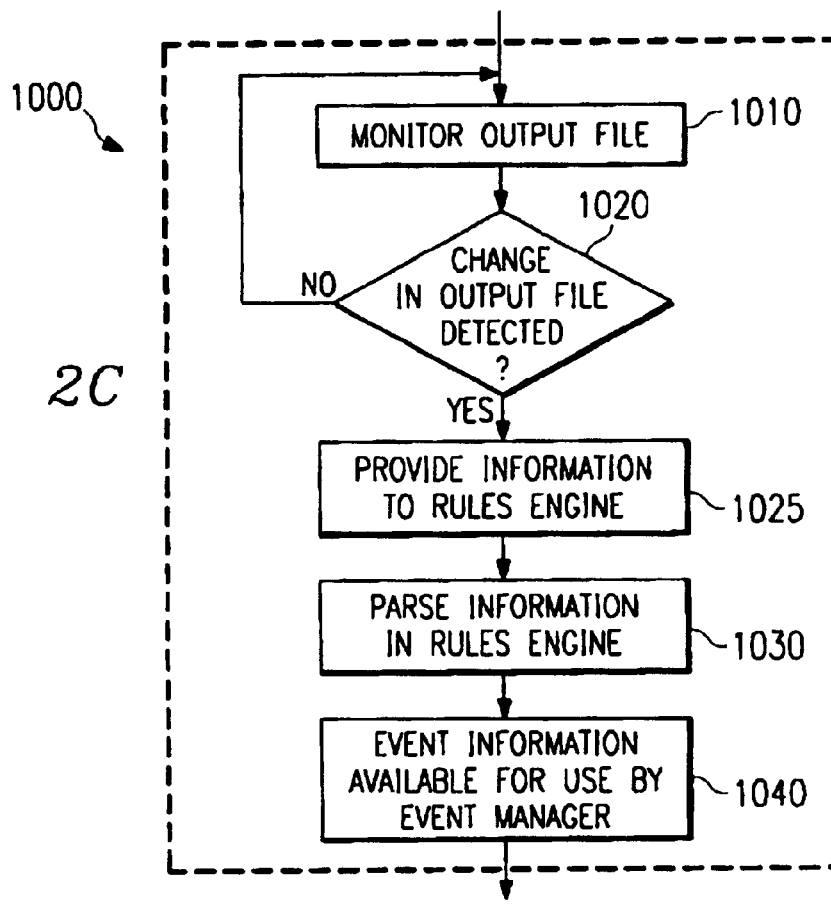
FIG. 2C is a flow chart illustrating exemplary steps of a portion of the flow chart shown in FIG. 2C, illustrating steps associated with monitoring processing of a problem record.

Details of step 700 of automatically generating a trouble ticket and opening and processing a problem record are discussed in conjunction with FIG. 2B. Step 700 accomplishes automatic transfer of event information from event manager application program 130 to help desk application program 230 in a format understandable by help desk application program 230.

Figure 2D:
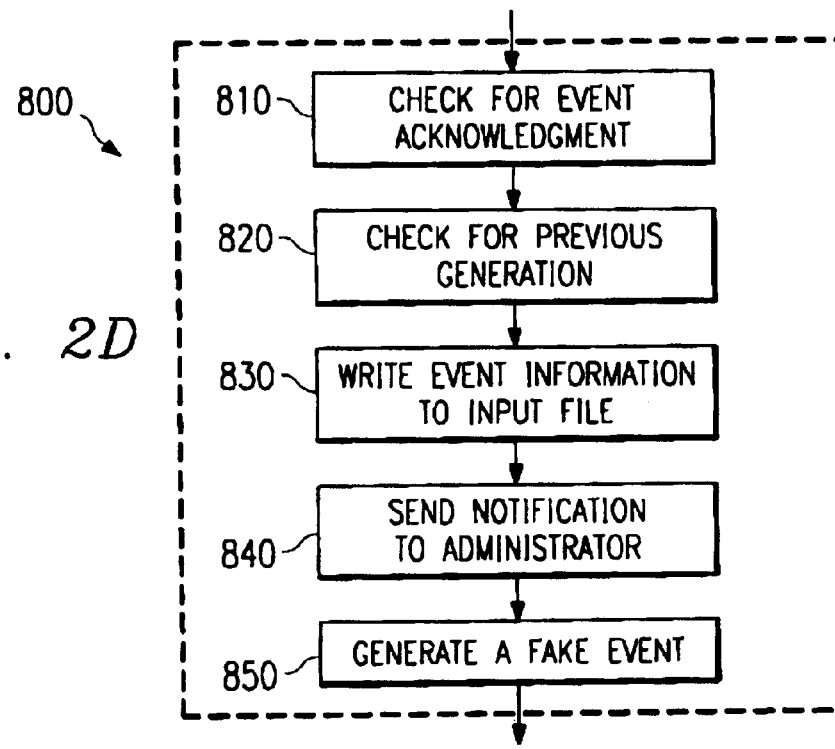
FIG. 2D is a flow chart illustrating exemplary steps of a portion of the flow chart shown in FIG. 2B, illustrating steps associated with executing a trouble ticket script.

FIG. 2B is a flow chart illustrating exemplary steps of step 700 of the flow chart illustrated in FIG. 2A, showing additional details associated with automatically generating a trouble ticket associated with an event received by event manager application program 130 and opening and processing a problem record based on the automatically generated trouble ticket. A first step 800 includes executing trouble ticket script 170. Exemplary steps associated with step 800 of executing trouble ticket script 170 are illustrated in FIG. 2D. As discussed in greater detail below, execution of trouble ticket script 170 appends to input file 176 event information associated with the event for which automatic generation of a trouble ticket was requested. This information is appended to input file 176 in a format consistent with the format of a trouble ticket conventionally used with a ServiceCenter help desk application. In one embodiment, event information associated with an event for which automatic generation of a trouble ticket is requested is available to trouble ticket script 170 as environment variables in Unix. These environment variables are listed below in Table 1, which is an example listing of trouble ticket script 170.

Input file 176 is monitored at step 710 by help desk input programming 196 for any changes to input file 176. If a change in input file 176 is detected at step 720, information appended to input file 176 by trouble ticket script 170 is sent to event input queue 250 of help desk application program 230. Sending information appended to input file 176 to event input queue 250 may be accomplished by execution of help desk input programming 240 at step 730.

One example of suitable help desk input programming 240 is the "AXFILED" programming associated with the AXCES application program available from Peregrine Systems, Inc. In such an embodiment, information is read from input file 176 and sent to an input queue 250 for subsequent processing by problem record processing programming 270 as illustrated at step 740. In that embodiment, problem record processing programming 270 includes problem record processing programming available as part of the ServiceCenter help desk. Once input queue 250 receives this event information, a program record associated with the non-conforming event is opened and processed. Problem record processing programming 270 manages processing of a problem record. For example, problem record processing programming 270 may reassign a problem record, update a problem record, escalate a problem record, or otherwise operate to manage processing of a problem record. Problem record processing programming 270 appends information relating to the status of the problem record to output file 180 at step 750. In performing this step, the information may first be stored in output queue 280 before transfer to output file 180. Examples of information appended to output file 180 include information identifying that a problem record has been opened or closed and an associated problem record identification number.

Thus, according to the invention, event information is automatically provided from event manager application program 130 to help desk application program 230 in a format understandable by help desk application program 230.

Details of step 1000 of monitoring processing of a problem record are discussed in conjunction with FIG. 2C. Step 1000 accomplishes transfer of status information concerning processing of a problem record from help desk application program 230 to event manager application program 130 in a format understandable by event manager application program 130.

FIG. 2C is a flow chart illustrating exemplary steps of step 1000 of the flow chart illustrated in FIG. 2A, illustrating steps associated with monitoring processing of a problem record. The step 1000 of monitoring processing of a problem record begins with step 1010 of monitoring output file 180 for changes. Logfile adapter 186 may perform this monitoring function. As illustrated in FIG. 2B, help desk application program 230 appends information regarding opening and closing of problem records to output file 180. In performing this step, the information may first be stored in output queue 280 before transfer to output file 180. If a change is detected in output file 180 at step 1020, step 1025 of providing to rules engine 190 the information in output file 180 regarding opening and closing of problem records is executed by logfile adapter 186. This information may include, for example, information that a problem record has been open or closed or a problem number associated with an open problem record.

Logfile adapter 186 has an associated format file for use in interpreting information in output file 180. An example format file is provided below in Table 1.

TABLE 1

Example Logfile Adapter Format File

```
FORMAT SC_Callnumber FOLLOWS Logfile_Base
tivpmo,%s+,%s:" OPEN %s %s %s %s "
hostname "ns1 dsmc1"
msg PRINTF("OPENED Service Center Call: %s", sc_callnumber)
sc_callnumber $6
ev_event_handle $3
ev_server_handle $4
ev_date_reception $5
-msg_catalog $2
adapter_host "ns1 dsmc2"
END
FORMAT SC_Close_Event FOLLOWS Logfile_Base
tivpmc,%s+,%s:"CLOSED %s %s %s %s"
hostname "ns1 dsmc1"
date $1
msg PRINTF("CLOSED Service Center Call: %s", sc_callnumber)
ev_server_handle $4
ev_event_handle $3
ev_date_reception $5
sc_callnumber $6
-msg_catalog $2
adapter_host "ns1 dsmc2"
END
```

Copyright © 1997 by Electronic Data Systems, Inc.

In conjunction with the format file, logfile adapter 186 interprets information associated with a problem received and provides that information to rules engine 190 in a format understandable by rules engine 190. At step 1030, rules engine 190 parses this information, or in other words, scans this information for recognizable strings, and at step 1040 makes the information available for use by event manager application program 130 in a format understandable by event manager application program 130 in order to update the status of an event or to provide the event with a problem record number associated with an open problem record.

For the embodiment in which event manager application program 130 is a Tivoli Enterprise Console, incoming messages into event manager application program 130 should be defined in advance as a particular message class that describes the structure and format of the incoming message. To facilitate definition of incoming messages from help desk application program 230 to event manager application program 130, the following Tivoli classes are defined: SC_Event, SC_Troubleticket, SC_Callnumber, and SC_Close_Event. Definition of these classes may be as illustrated below in Table 2, in which the SC_Troubleticket, SC_Callnumber, and SC_Close_Event classes are each a type of the SC_Event class, and SC_Event is a type of an Event class, defined by the ServiceCenter application program available from Peregrine Systems, Inc.

TABLE 2

Definition of Tivoli Classes

```
TEC_CLASS:
    SC_EVENT ISA EVENT
    DEFINES {
        source: default + "SC";
        sc_server_handle: INTEGER;
        ev_server_handle: INTEGER;
        ev_date_reception: INT32;
        ev_event_handle: INTEGER;
    };
END
TEC_CLASS:
    SC_Troubleticket ISA SC_EVENT
    DEFINES {
    };
END
TEC_CLASS:
    SC_Callnumber ISA SC_EVENT
    DEFINES {
    };
END
TEC_CLASS
    SC_Close_Event ISA SC_EVENT
    DEFINES {
    };
END
```

Copyright © 1997 by Electronic Data Systems, Inc.

In the embodiment in which event manager application program 130 is a Tivoli Enterprise Console, information sent by help desk application program 230 to event manager application program 130 preferably matches one of these classes.

Providing information appended to output file 180 and interpreted by logfile adapter 186 regarding the opening or closing of a problem record to event manager application program 130 in a form understandable by event manager application program 130 may be accomplished at step 1040 through the use of rules engine 190. For example, rules engine 190 may update an event in the event manager application program 130 to reflect that a trouble ticket has been requested for the event, update an event in the event manager application program 130 to contain a problem record number associated a problem record, or change the status of an event in the event manager application program 130 to "CLOSED" when a corresponding problem record number is closed.

In addition, rules engine 190 may drop events. An example of dropping an event is dropping "fake events" sent to event manager application program 130 by trouble ticket script 170. A fake event may be sent by help desk application program 230 to event manager application program 130 as a method for communicating to event manager application program 130 that a trouble ticket has been generated. Such a fake event provides immediate feedback to a monitoring operator who requested generation of a trouble ticket. Once a fake event provides this information, it may be dropped by rules engine 190. A listing of example rules included in an example of rules engine 190 is given below in Table 4.

Thus, through the use of output file 180, logfile adapter 186, and rules engine 190, status information may be provided to event manager application 130 in a format understandable by event manager application program 130. Therefore, according to the invention, status information may be automatically transferred from help desk application program 230 to event manager application program 130 in a format understandable by event manager application program 130.

Details of step 800 of executing trouble ticket script 170 are described in conjunction with FIG. 2D. Execution of trouble ticket script 170 automatically generates a trouble ticket, which is stand in input file 176, thus facilitating automatic transfer of event information from event manager application program 130 to help desk application program 230.

FIG. 2D is a flow chart illustrating exemplary steps associated with step 800 of the flow chart shown in FIG. 2D, illustrating steps associated with executing trouble ticket script 170. A first step of executing trouble ticket script 170 may include step 810 of checking for event acknowledgment. Event acknowledgment may occur, for example, in response to a monitoring operator manually acknowledging an event by clicking an associated menu button on a computer display. Event acknowledgment may occur when automatic generation of a trouble ticket is commanded. As another example, an event may be acknowledged automatically by event manager application program 130 based upon predetermined criteria. If an event is acknowledged, processing may continue. If an event is not acknowledged, processing is halted. In one embodiment an event acknowledgment check is performed by examining the contents of an environment variable storing the status of an event. If the status of an event is "OPEN," then it has not been acknowledged and trouble ticket script 170 is exited. If the status of an event is "ACKNOWLEDGED," then it has been acknowledged.

After an event is acknowledged a check is performed at step 820 for previous generation of a problem record associated with the event. In one embodiment, checking to see if a problem record has been previously generated is accomplished by examining an environment variable associated with event manager application program 130. If no previous problem record was generated, a problem record is opened and event information is written to input file 176 at step 830. Steps associated with one example of writing event information to input file 176 are provided in an example trouble ticket script listing provided below in Table 3.

At step 840, notification that event information has been written to input file 176 is sent to event manager application program 130. In one embodiment, this notification is addressed to an administrator of event manager application program 130. In another embodiment, a monitoring operator that acknowledged an event for assignment to help desk application program 230 is stored as an environment variable, and notification is sent to that monitoring operator.

At step 850, a fake event is generated. A fake event is generated to update the original event that was received by the event manager application program 130 with an indication that a trouble ticket has been generated for the event. The fake event is sent to event manager application program 130 by using the event handling capabilities of event manager application program 130. The received fake event is then dropped by rules engine 190. An example of sending a fake event to event manager application program 130 is provided in the example trouble ticket listing shown in Table 3.

The above steps 810, 820, 830, 840, and 850 are exemplary steps associated with step 800 of executing trouble ticket script 170, which facilitates automatic transfer of event information from event manager application program 130 to help desk application program 230. Thus, the invention allows for automatic support of computing systems or devices by automatically providing information exchange between an event manager application program and a help desk application program.

Although the invention has been particularly shown and described by the foregoing detailed description, it will be understood by those skilled in the art that various changes in form and detail may be made without departing from the spirit and scope of the invention.

TABLE 3

Example Trouble Ticket Script

```
#!/bin/ksh

# ---------------------------------------
# $Header$
# ---------------------------------------
#Copyright © 1997 by Electronic Data Systems, Inc.
# This script is used to allow for events viewed through the
# Tivoli Event Console to be used in creating Trouble Tickets

# The first and only argument to this shell is the value passed in
# from the Dialog Description language. Using the AEF, the
# dialog can be extended to use this shell script to invoke other
# actions by switching on this argument.

# The slot values defined for the root class of the T/EC Events
# are set in the environment prior to invoking this shell

# These environment variables are

# ACL, ADAPTER_HOST, ADMINISTRATOR, CAUSE_DATE, CAUSE_HNDL,
# CLASS_NAME, DATE_EVENT, DATE_RECEPTION, EV_KEY,
FORMATTED_DATE,
# HANDLE, HOSTNAME, MSG, ORIGIN, SEVERITY, SOURCE, SRVR_HANDLE,
# STATUS, SUB_ORIGIN, and SUB_SOURCE

# The object ID of the client where the invocation of this shell
# occurred can be obtained from the environment variable TMF_SELF.

##########################################################
# Change Control

```

TABLE 3-continued

Example Trouble Ticket Script

```
# Name              Date       Version    Description
# ----              ----       -------    -----------
#                              1.0        Initial Version
# E MacDonncha      12/8/96    1.2        - Changes to the
#                                           processing of
#                                           $SEVERITY.
#                                         - Got rid of %customer%,
#                                           %assignment% and %priority%
#                                         - Got rid of the date
#                                           blocking.
###########################################################
# Setting up output destination:
# (use alternate output for testing)
###########################################################

OUT=/opt/sc/tec/tivoli.in
#OUT=/tmp/tivoli.in
###########################################################
# Report generator:
###########################################################
TMPFILE=/tmp/TT$$
gen_file () {
   echo "" > $TMPFILE
   echo "Trouble Ticket $1 for" >> $TMPFILE
   echo "" >> $TMPFILE
   echo "Class:            ${CLASS_NAME}"         >> $TMPFILE
   echo "Source:           ${SOURCE}"             >> $TMPFILE
   echo "Sub_Source:       ${SUB_SOURCE}"         >> $TMPFILE
   echo "Host:             ${HOSTNAME}"           >> $TMPFILE
   echo "Origin:           ${ORIGIN}"             >> $TMPFILE
   echo "Sub_Origin:       ${SUB_ORIGIN}"         >> $TMPFILE
   echo ""                                        >> $TMPFILE
   echo "Ev_Key:           ${EV_KEY}"             >> $TMPFILE
   echo "Date:             ${FORMATTED_DATE}"     >> $TMPFILE
   echo "Severity:         ${SEVERITY}"           >> $TMPFILE
   echo "Status:           ${STATUS}"             >> $TMPFILE
   echo "Administrator:    ${ADMINISTRATOR}"      >> $TMPFILE
   echo ""                                        >> $TMPFILE
   echo "Msg:              ${MSG}"                >> $TMPFILE
   echo ""                                        >> $TMPFILE
}
###########################################################
# Event must be acknowledged to raise a trouble ticket.
###########################################################
if [ "${STATUS}" = "OPEN"]
then
   exit 1
fi
###########################################################
# If message starts with *, discard TT, is already generated
###########################################################
TT_TRUE=${MSG%%\**}
if [ "$TT_TRUE" = "" ] ; then
   exit 1
fi
###########################################################
# Fixing plogger bug sending \r chars inside $MSG
###########################################################
LineMSG=`echo $ {MSG} | awk -F"\n" '{gsub("\r", "|"); printf "%s", $0}"
#echo "MSG=">/tmp/gt
#echo $MSG>>/tmp/gt
#echo "lineMSG=">>/tmp/gt
#echo $lineMSG>>/tmp/gt
###########################################################
# Setting up fields used by PNMS
# Field for which Tivoli can't provide values are left blank
###########################################################

#########################
# open or close ticket
#########################

if [ "${STATUS}" = "CLOSED" ] ; then
   evtype=tivpmc
   gen_file closed
else
   evtype=tivpmo
```

TABLE 3-continued

Example Trouble Ticket Script

```
   gen_file generated
fi
########################
# pass date info in form suitabie for PNMS
# it is impossible to use other DATE variables
# as they don't have a defined format
########################

evtime=`echo $ {FORMATTED_DATE} | awk`
   BEGIN{
      month["Jan"]="01"
      month["Feb"]="02"
      month["Mar"]="03"
      month["Apr"]="04"
      month["May"]="05"
      month["Jun"]="06"
      month["Jul"]="07"
      month["Aug"]="08"
      month["Sep"]="09"
      month["Oct"]="10"
      month["Nov"]="11"
      month["Dec"]="12"
   }
   # format MM/DD/YY hh:mm:ss
#    {print month[$1] "/" $2 "/" substr($4,3) " " $3}
     {print ""}
`'
# {print month[$1] "/" $2 "/" "11" " " $3}
# {print month[$1]"/" $2 "/" substr($4,3) " " $3}
##############################################################
# Determine the TT Category
##############################################################
#case $ {SUB_SOURCE} in
#    SEC                                  ) category='EDS.NL.SMC.SECURITY';;
#    BCK                                  ) category='EDS.NL.SMC.B/R';;
#    APPL_SC                              ) category='EDS.NL.SERVICECENTER';;
#    *                                    )
#       case ${SOURCE} in
#          HPOV                           ) category='EDS.NL.SMC.UNIX';;
#          SVV                            ) category='EDS.NL.SMC.NETWARE';;
#          NT                             ) category='EDS.NL.SMC.NT';;
#          LOGFILE | SCRIPT | PATROL      ) category='EDS.NL.SMC.UNIX';;
#          *                              ) category='EDS,.NL.SMC.CI';;
#       esac
#egac

##############################################################
# Split longer lines (longer than 75) into separate lines
##############################################################

actioni=`echo $ {MSG}|cut -b1-75 -n`
actionii=`echo $ {MSG}|cut -b76- -n`
if ["${actionii}"=""]; then
   actionii="TivoliClass=${CLASS_NAME} "
   actioniii=
else
   actioniii="TivoliClass=${CLASS_NAME} "
fi

##############################################################
# change the ADMINISTRATOR variable to first six positions
##############################################################

SCUSER=`echo $ADMINISTRATOR | awk ' {print toupper(substr($1,1,6))}'`
##############################################################
#split the event key into three parts
##############################################################
EVSH=`echo $EV_KEY | awk '{print substr($1,1,1,)}'`
EVEH=`echo $EV_KEY | awk '{print substr($1,2,1)}'`
EVDATE=`echo $EV_KEY | awk '{print substr($1,3)}'`
########################
#setup the other fields
########################

evsysseq=
evusrseq=$ {EV_KEY}
evsysopt=
```

TABLE 3-continued

Example Trouble Ticket Script

```
evuser=${SCUSER}
evpswd=
evsepchar="^"
logical=
network=${HOSTNAME}
reference=
cause=
networkaddress=
type=
domain=
objid=
version=
model=
serial=
vendor=
location=
contactname=
contactphone=
resolution=
evsh=${EVSH}
eveh=${EVEH}
evdate={EVDATE}
severity=${SEVERITY}
###########################################################
# Putting all fields together
###########################################################

Di="${evtype},${evtime},${evsysseq},${evusrseq},${evsysopt},"
Dii="${evuser}, ${evpswd},${evsepchar},${logical}${evsepchar}"
Diii="${network}${evsepchar}${reference}${evsepchar}${cause}"
Div="${evsepchar}${actioni}${evsepchar}${actionii}${evsepchar}"
Dv="${actionii}${evsepchar}${networkaddress}${evsepchar}"
Dvi="${type}${evsepchar}${category}${evsepchar}${domain}"
Dvii="${evsepchar}${objid}${evsepchar}${version}${evsepchar}${model}"
Dviii="${evsepchar}${serial}${evsepchar}${vendor}${evsepchar}${location}"
Dix="${evsepchar}${contactname}${evsepchar}${contactphone}"
Dx="${evsepchar}${resolution}${evsepchar}${evsh}${evsepchar}"
Dxi="${eveh}${evsepchar}${evdate}${evsepchar}${severity}"
###########################################################
# Appending result to output file
###########################################################

echo
"${Di}${Dii}${Diii}${Div}${Dv}${Dvi}${Dvii}${Dviii}${Dix}${Dx}${Dxi}"
>>
$OUT
###########################################################
# Send reply to Admin
###########################################################
ADMIN="`echo $ADMINISTRATOR | awk -F\@ '{print $i}'`"
wsendresp ${ADMIN} $TMPFILE
###########################################################
# Update the Tivoli Message Slot by sending a fake event
###########################################################
wpostemsg -m "Fake Event!!" -rWARNING sub_source=TT\
   ev_server_handle=$SRVR_HANDLE
ev_date_reception=$DATE_RECEPTION\
   ev_event_handle=$HANDLE SC_Troubleticket SC
###########################################################
# Delete the temporary file we've created . . .
###########################################################
rm -f $TMPFILE
exit
```

TABLE 4

Example Rules

```
/* Service Center Rule Set
 * Copyright © 1997 Electronic Data Systems, Inc.
 *   Service Center rule set for Service Center events.
 * Author: Fred Kouwenberg
 *
```

TABLE 4-continued

Example Rules

```
 * MODIFICATIONS
 */
/*************************************************************
 ***************/
/*************** RULES
```

TABLE 4-continued

Example Rules

```
*********************/
/*************************************************************
**************/
rule: sc_tt_generated : (
    description: 'Updates the message slot by putting an asterisk in
front of the message',
    event: _event of_class 'SC—Troubleticket'
        where [ ev_server_handle: _sh,
            ev_date_reception: _dr,
            ev_event_handle: _eh],
    reception_action: update_msg_slot: (
        all_instances (event:
            _mod_event of_class 'EVENT'
            where [ server_handle: equals _sh,
                date_reception: equals _dr,
                event_handle: equals _eh,
                status: equals 'ACK',
                msg: _msg]),
            atomconcat ([`*`,_msg], _new_msg),
            bo_set_slotval(_mod_event, msg,_new_msg),
            re_mark_as_modified(_mod_event,_),
            drop_received_event
    )
)
/****/
rule: drop_fake_event: (
    description: 'Drops the fake event when the old event is alread
gone',
    event: _event of_class 'SC—Troubleticket'
        where [ msg: _msg],
    reception_action: drop_received_fake_event: (
        atompart(_msg, 'Fake Event', 1 , _),
        drop_received_event,
        commit_rule
    )
)
/****/
rule: sc_callnumber_generated : (
    description: 'Updates the sc_callnumber slot with the actual SC
Callnumber',
    event: _event of_class 'SC—Callnumber'
        where [ ev_server_handle: _sh,
            ev_date_reception: _dr,
            ev_event_handle: _eh,
            sc_callnumber: _scc],
    reception_action: update_sc_slot: (
        all_instances(event:
            _mod_event of_class .'EVENT'
            where [ server_handle: equals _sh,
                date_reception: equals _dr,
                event_handle: equals _eh,
                msg: _msg,
                status: equals 'ACK']),
            atomconcat([`**`,_scc ], _new_msg_1),
            atomconcat([_new_msg_1, _msg], _new_msg),
            re_mark_as_modified(_mod_event,_),
            drop_received_event,
            commit_rule
    )
)
/****/
rule: drop_sc_OPENED_event : (
    description: 'Drops the event that reports that a Service Center
Call is OPENED',
    event: _event of_class 'SC—Callnumber'
        where [ msg: _msg],
    reception_action: drop_received_sc_OPENED_event: (
        atompart(_msg, 'OPENED', 1, _),
        drop_received_event,
        commit_rule
/****/
rule: sc_close_event: (
    description: 'Closes the Tivoli event when the SC event is closed',
    event:_event of_class 'SC—Close—Event'
        where [ ev_server_handle: _sh,
            ev_date_reception: _dr,
            ev_event_handle: _eh],
```

TABLE 4-continued

Example Rules

```
        reception_action: close_tivoli_event: (
            all_instances(event:
                _mod_event of_class: 'EVENT'
                where [ server_handle: equals _sh,
                    date_reception: equals _dr,
                    event_handle: equals _eh]),
                set_event_status(_mod_event, 'CLOSED'),
                re_mark_as_modified(_mod_event,_),
                drop_received_event,
                cotnmit_rule
        )
    )
/****/
rule: drop_sc_CLOSED_event : (
    description: 'Drops the event that reports that a Service Center
Call is CLOSED',
    event: _event of_class 'SC—Close—Event'
        where [ msg: _msg],
        reception_action: drop_received_sc_CLOSED_event: (
            atompart(_msg, 'CLOSED', 1, _),
            drop_received_event,
            commit_rule
        )
    )
/*************************************************************
**************/
/******************* CHANGE RULES
*********************/
/*************************************************************
**************/
/*************************************************************
**************/
/******************* TIMER RULES
*********************/
/*************************************************************
**************/
```

What is claimed is:

1. A method for managing a computer system, the method comprising:
    receiving event information at a Tivoli Enterprise Console, the event information associated with the computer system;
    receiving a command to provide a portion of the event information to a help desk application program;
    automatically translating the event information, via interface programming, to a format readable by a Service-Center help desk application program;
    determining, via the interface programming if an identification number associated with the event information has been generated; and
    generating, via the interface programming, an identification number associated with the event information if an identification number associated with the event information has not been generated.

2. The method of claim 1 further comprising the step of automatically providing the event information to the ServiceCenter help desk application program.

3. The method of claim 1 and further comprising automatically generating a trouble ticket.

4. The method of claim 1 and further comprising automatically providing the identification number to the Tivoli Enterprise Console.

5. The method of claim 1 and further comprising the steps of:
    determining whether a problem record associated with the event information has been generated; and
    opening a problem record associated with the event information if a problem record has not been generated.

6. The method of claim 1 wherein the step of receiving a command to provide a portion of the event information to a help desk application program comprises receiving a command automatically generated based on the content of the event information.

7. The method of claim 1 and further comprising the steps of:
opening a problem record associated with the event information;
processing the problem record; and
automatically providing status information associated with processing the problem record to the Tivoli Enterprise Console.

8. The method of claim 7 wherein the step of automatically providing status information comprises the steps of:
monitoring an output file for added information;
detecting added information in the output file; and
translating the added information into a format understandable by a Tivoli Enterprise Console.

9. A management system for managing a monitored device, the management system comprising:
a computing system comprising at least one processor and at least one memory accessible by the at least one processor;
a Tivoli Enterprise Console event management system stored in the computing system, the event management system operable to receive and process an event having event information, the event associated with the monitored device;
a ServiceCenter help desk application program stored in the computing system, the help desk application program operable to process a problem record; and
interface programming stored on the computing system operable to automatically provide the event information associated with the event to the help desk application program in a format readable by the help desk application program,
wherein the interface programming is further operable to:
determine if an identification number associated with the event has been generated; and
generate an identification number associated with the event if an identification number associated with the event has not been generated.

10. The management system of claim 9 wherein
the interface programming is further operable provide the identification number to the event management system.

11. The system of claim 9 wherein the interface programming is further operable to automatically provide status information associated with the problem record in a format understandable by the Tivoli Enterprise Console.

12. A management system for managing a monitored device, the management system comprising:
a computing system comprising at least one processor and at least one memory accessible by the at least one processor;
a Tivoli Enterprise Console event management system stored in the computing system, the event management system operable to receive and process an event having event information, the event associated with the monitored device;
a ServiceCenter help desk application program stored in the computing system, the help desk application program operable to process a problem record; and
interface programming stored on the computing system operable to automatically provide the event information associated with the event to the help desk application program in a format readable by the help desk application program, wherein the interface programming is further operable to monitor an input file for changes and in response to detecting changes transmit information contained in the file to the ServiceCenter help desk application program.

13. A systems management system, the system comprising:
a computing system comprising at least one processor and at least one memory accessible by the at least one processor;
a Tivoli Enterprise Console stored in the computing system and operable to run on the computing system, the Tivoli Enterprise Console operable to receive and process an event, the event containing event information;
a ServiceCenter help desk application stored in computing system and operable to run on the computing system, the ServiceCenter help desk operable to process a trouble ticket; and
interface programming stored on the computing system operable to automatically generate a trouble ticket based on the event information, wherein the interface programming further comprises programming operable to monitor an output file for changes and in response to detecting changes in the output file provide information associated with the trouble ticket to the Tivoli Enterprise Console in a format understandable by the Tivoli Enterprise Console.

14. The system of claim 13 wherein the interface programming further comprises programming operable to determine if a trouble ticket has previously been generated for the event.

15. The system of claim 13 wherein the interface programming further comprises programming operable to send a fake Tivoli event to the ServiceCenter, the fake Tivoli event indicating that a trouble ticket has been requested for the event.

16. The system of claim 13 wherein the interface programming further comprises programming operable to receive information in response to the ServiceCenter processing a trouble ticket and provide an identification number associated with the trouble ticket to the Tivoli Enterprise Console.

17. The system of claim 13 wherein the interface programming further comprises an AXFILED process and the interface programming further comprises an executable file operable to generate an input file based on the event information, the input file having a format the can be read by the ServiceCenter AXFILED process.

18. A systems management system, the system comprising:
a computing system comprising at least one processor and at least one memory accessible by the at least one processor;
a Tivoli Enterprise Console stored in the computing system and operable to run on the computing system, the Tivoli Enterprise Console operable to receive and process an event, the event containing event information;
a ServiceCenter help desk application stored in computing system and operable to run on the computing system, the ServiceCenter help desk operable to process a trouble ticket; and
interface programming stored on the computing system operable to automatically generate a trouble ticket based on the event information, wherein the interface programming further comprises programming operable to monitor an input file for changes to the input file and upon detecting changes to the input file transmit information contained in the input file to a portion of the ServiceCenter help desk application in a format understandable by the ServiceCenter help desk application.

19. A method for managing a computer system, the method comprising:

receiving event information at a Tivoli Enterprise Console, the event information associated with the computer system;

receiving a command to provide a portion of the event information to a help desk application program;

automatically providing the event information associated with the event to the help desk application program in a format readable by the help desk application program; and monitoring an input file, via interface programming, for changes and in response to detecting changes transmit information contained in the file to the help desk application program.

20. The method of claim 19, further comprising monitoring an output file, via interface programming, for changes and in response to detecting changes in the output file provide information associated with the event to the Tivoli Enterprise Console in a format understandable by the Tivoli Enterprise Console.

21. The method of claim 19, further comprising automatically determining, via interface programming, whether a trouble ticket has previously been generated for the event.

22. The method of claim 19, further comprising transmitting, via interface programming, a fake Tivoli event to the help desk application program, the fake Tivoli event indicating that a trouble ticket has been requested for the event.

* * * * *